United States Patent [19]
Clark et al.

[11] 3,906,851
[45] Sept. 23, 1975

[54] STRAPPING MACHINE

[75] Inventors: Robert P. Clark, Cheshire; Robert Lee Haven, Enfield; Franz A. Kneidl, Milford, all of Conn.

[73] Assignee: The Stanley Works, New Britain, Conn.

[22] Filed: June 14, 1974

[21] Appl. No.: 479,223

Related U.S. Application Data
[62] Division of Ser. No. 348,983, April 9, 1973.

[52] U.S. Cl. ................... 100/4; 100/26; 100/33 PB
[51] Int. Cl.² .......................................... B65B 13/32
[58] Field of Search ......... 100/4, 26, 33, 33 PB, 29; 53/198; 156/157

[56] References Cited
UNITED STATES PATENTS

| | | | |
|---|---|---|---|
| 3,269,300 | 8/1966 | Billett et al. | 100/33 PB |
| 3,447,447 | 6/1969 | Rutty | 100/4 |
| 3,470,814 | 10/1969 | Tschappu | 100/4 |
| 3,566,778 | 3/1971 | Vilcins | 100/33 X |
| 3,749,622 | 7/1973 | Sato et al. | 156/157 |
| 3,759,169 | 9/1973 | Goodley | 100/33 PB X |
| 3,771,436 | 11/1973 | Sato | 100/33 PB |

*Primary Examiner*—Billy J. Wilhite
*Attorney, Agent, or Firm*—Prutzman, Hayes, Kalb & Chilton

[57] ABSTRACT

A fixed clamp and shear member is provided in a combination clamping, sealer and shearing device with a strap guide opening extending through the clamp and shear member adjacent a free end of that member serving as an abutment face which cooperates with a movable clamp for clamping a leading end of strap trained from a strap supply through the strap guide opening and into a loop about an article to be bound. A movable shear member is mounted for sliding movement on the fixed clamp and shear member and is reciprocable between a retracted position, wherein the strap guide opening is exposed for strap feeding and tensioning, and an extended position wherein the movable shear is in lapping relation to the strap guide opening of the fixed shear and clamping member to effect strap shearing. The movable clamp in its operative clamping position serves as a stop for the movable shear and establishes a seal pressing position for the movable shear intermediate its retracted and extended positions wherein the movable shear presses opposed heated strap surfaces into a fused seal after withdrawal of a pivotably supported heating element from between the strap surfaces and before the movable clamp is released to permit final movement of the shear member into its extended position to shear the strap in the strap guide opening from the strap supply.

22 Claims, 16 Drawing Figures

STRAPPING MACHINE

This is a division of application Ser. No. 348,983, filed Apr. 9, 1973, which invention relates to strapping articles such as boxes, cartons, bales and similar packages and particularly concerns the strapping of such articles with a length of generally flat strap formed into a loop about an article with the ends of the strap sealed face-to-face to secure the loop.

Still another object of this invention is to provide a new and improved strapping mechanism for binding an article and which employs a significantly simplified construction of compact, economical design constructed to provide accurate and reliable operation over an extended period of time with minimum service requirements. Included in this object is the aim of providing a new and improved strap guideway system particularly suited for accumulating excess infeed of strap after movement of the leading free end of strap has been arrested.

A further object of this invention is to provide a strapping machine with a new and improved combined strap clamping, sealer and shearing mechanism including a heating element for heating and softening lapping confronting strap surfaces of solid nonmetallic heat sealable material to be fused into a solid joint of high strength in a quick and accurate operation.

A still further object of this invention is to provide a new and improved mechanism of the above type wherein the heating nozzle in an inactivated condition additionally serves to act as a stop for a leading free end of the strap during strap feeding while also acting to guide strap through an open section of the strap guideway at the strap sealing station and to minimize any strap buckling at the strap sealing station.

Yet another object of this invention it to provide such a mechanism which is adjustable for minimizing need for close tolerances while yet providing precision alignment of the clamping members.

Still another object of this invention is to provide such a mechanism having an improved strap re-entry rail and gate assembly which is adjustable for ensuring optimum alignment of the strap at the sealing station for maximum joint strength.

A further object of this invention is to provide a strapping mechanism of the type described which is provided in a compact package suited for mounting in various positions in different installations and which is relatively economical to manufacture and assemble.

A still further object of this invention is to provide a strapping mechanism having an improved tensioning unit for accurately tensioning strap after takeup of excess strap about the article to be strapped while a leading free end of the strap is being held and thereafter producing a relatively reduced rate of strap withdrawal and a high tension pull to the strap without overstressing or entangling the strap.

Other objects will be in part obvious and in part pointed out in more detail hereinafter.

A better understanding of the objects, advantages, features, properties and relationships of the invention will be obtained from the following detailed description and accompanying drawings which set forth an illustrative embodiment and is indicative of the ways in which the principles of this invention are employed.

Figure 1:
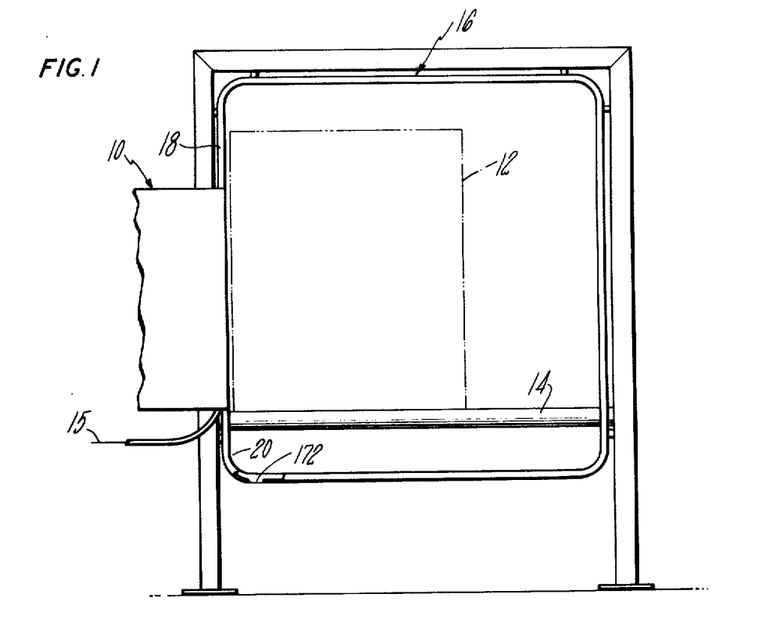
FIG. 1 is a side elevational view, partly broken away, schematically showing an exemplary strapping machine installation incorporating the present invention and installed for applying a tensioned loop of strap about a package, shown in broken lines, supported on a roller conveyor of the installation.

Referring to the drawings in detail, an embodiment of the machine incorporating this invention is generally denoted by the numeral 10 and is shown in a strapping machine installation in FIG. 1 for use with solid nonmetallic strap of heat sealable plastic, e.g., polypropylene or other suitable plastics such as various types of synthetic polymeric material of acceptable brittleness and tenacity and suitable elongation characteristics with a relatively low melting point. The strap used in this invention is of generally flat configuration to be applied about an article 12 supported on a roller conveyor 14.

The installation will be understood to include a strap supply such as a coil dispenser, not shown, from which strap 15 is paid-out to a generally rectangular strap chute 16 for encircling the article 12 with a loop of strap. The chute 16 has an entrance end 18 and a re-entry end 20. The entrance end 18 is immediately above a strap sealing station 22 (best seen in FIG. 3) for receiving a free or loose leading end of strap 15 from a strap guide assembly 24 of the machine 10. The re-entry end 20 is for feeding the leading end of strap into a re-entry rail and gate assembly 26 of the machine which directs strap back into the sealing station 22.

The strap chute 16 and the re-entry rail and gate assembly 26 are of a type well known to those skilled in this art and provide for guiding strap during feeding while permitting strap release from the rails onto the article 12 to be bound upon tensioning the strap 15. For the purpose of this disclosure, the term strap guideway means is intended to include the strap guide assembly 24 on the strap supply side of the sealing station, the strap chute 16 and the strap re-entry rail and gate assembly 26 of the machine.

In accordance with this invention, the re-entry rail and gate assembly 26 is adjustable both longitudinally as well as being laterally adjustable from side-to-side for precision feeding of strap into the strap sealing station at a desired location.

Figure 4:
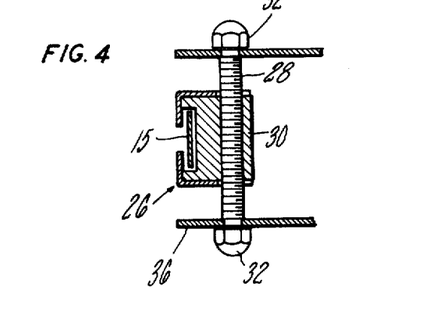
FIG. 4 is a sectional view, partly broken away, of a portion of a strap re-entry rail and gate assembly of the mechanism of FIG. 2.

For this purpose a pair of rail supporting lead screws such as the one shown at 28 in FIG. 4 are received in aligned openings formed through upper and lower sections of the assembly 26 to extend through tapped holes in the rail 30 in threaded engagement with the rail. Suitable nuts 32 are threaded onto ends of each lead screw 28 projecting laterally outwardly from opposite sides of the rail 30 through elongated slots such as at 34 formed in a housing 36 of a frame 38 of the strap clamping, seal and shearing mechanism 40. Nuts 32 are threaded onto the projecting ends of lead screws 28 to bottom against the ends of the screws. Nuts 32 may be rotated in a selected angular direction to rotate the lead screws 28 and cause the tapped rail 30 to move in a selecated lateral direction to provide desired strap support and guidance into the sealing station 22, while the nuts 32 simply rotate in fixed relation to the screws 28 during such lead screw rotation and lateral adjustment of the re-entry rail 30.

For longitudinally adjusting the re-entry rail 30 parallel to the strap feed path through assembly 26, a jack screw mounting device is shown at 42 which includes an L-shaped bracket 44 fixed to the housing 36 with a jack screw 46 and locking nut 48 mounted on the bracket 44 to extend upwardly with the shank end of the jack screw 46 engaging a swinging end of a lever 50 supported for pivotal movement about a pin 52 secured to housing 36. The upper lead screw 28 is extended through and supported on the lever 50 to permit selective raising and lowering of the rail 30 responsive to rotary adjustment of the screws, 46, it being understood that a jack screw mounting device such as at 42 is provided on each side of the re-entry rail and gate assembly 26.

Figure 3:
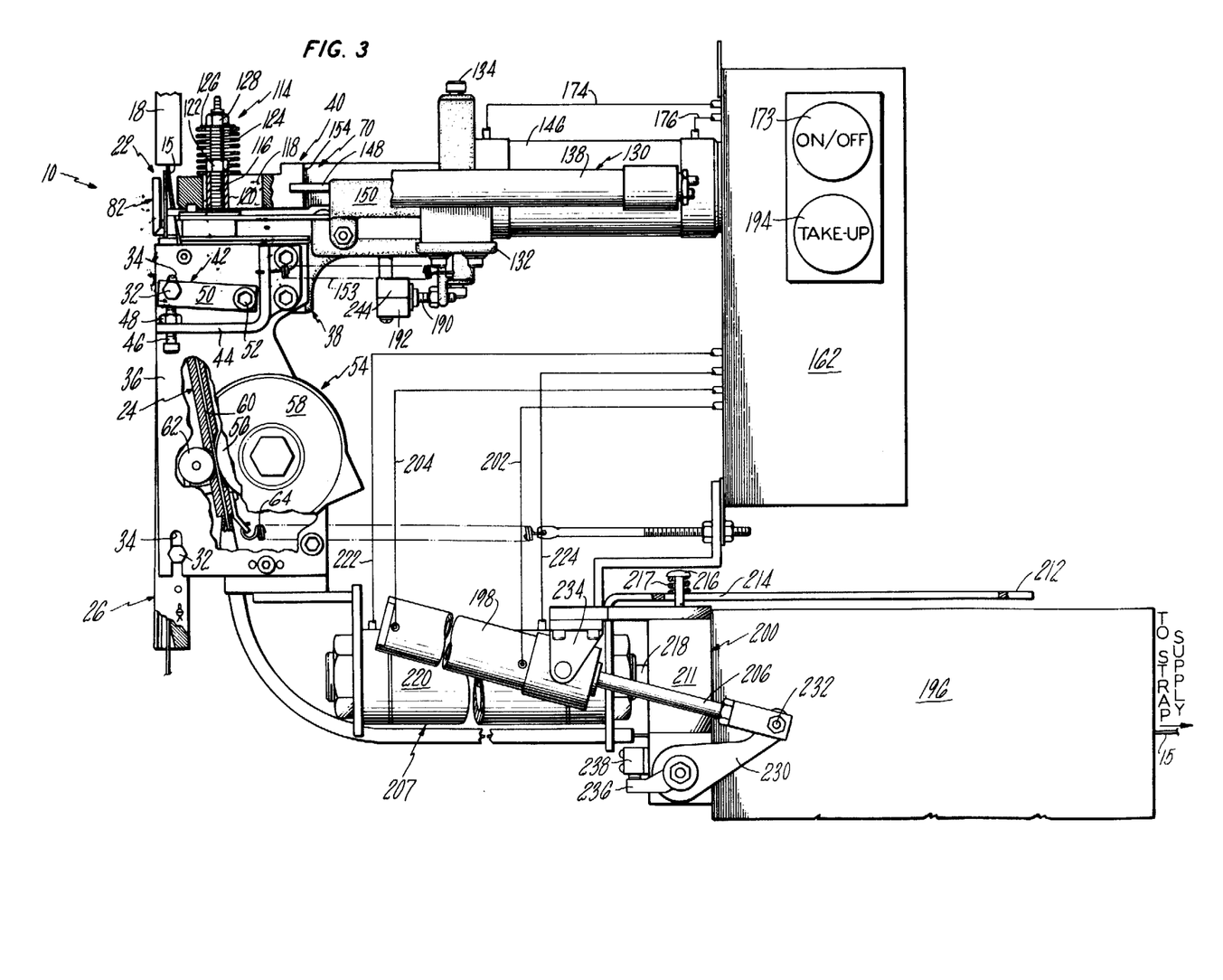
FIG. 3 is a side elevational view, partly broken away, of the mechanism of FIG. 2.

As shown, the frame 38 of machine 10 is a multi-part unit for mounting various parts of the machine in proper operative association. Referring now specifically to FIG. 3, the machine 10 is shown comprising in operative alignment a strap feed and takeup mechanism 54, the strap guide assembly 24 leading into the strap sealing station 22 which is upstream of the entrance end 18 of the strap chute 16 and downstream of the re-entry rail and gate assembly 26 of the machine, and the aforementioned combined strap clamping, sealer and shearing mechanism 40 at the strap sealing station 22.

The feed and takeup mechanism 54 includes a feed wheel 56 connected to be driven by a reversible air motor 58 mounted on the housing 36. The feed wheel 56 has a resilient driving surface for frictionally engaging the surface of the strap for guiding it through the combined strap clamping, sealer znd shearing mechanism 40 and into the entrance end 18 of the strap chute 16, around the chute and into the sealing station 22. The feed wheel 56 is mounted adjacent but outwardly of the strap guide assembly 24 of the machine 10 with the driving surface of the feed wheel 56 substantially aligned with an internal guideway 60 formed within the strap guide assembly 24. A rotatable backup wheel 62 is shown mounted on the strap guide assembly 24 which is biased by a suitably anchored adjustable spring 64 to selectively set the frictional driving engagement required for the feed wheel 56 to feed strap through the strap guide assembly 24, and particularly to prevent strap damage during takeup upon stall of the air motor 58. The reversible air motor 58 is driven in one direction to feed strap 15 into a loop about the article 12 during which phase the feed wheel 56 is directly driven by the air motor 58 to provide a relatively high speed strap feedout through the chute 16. It should be noted that as strap is fed by the feed wheel 56 into the entrance end 18 of the chute 16, the strap passess through an open section of the strap guideway means at the sealing station 22 (FIG. 3) between the strap guide assembly 24 of the machine 10 and the entrance end 18 of the chute 16.

Figure 15:
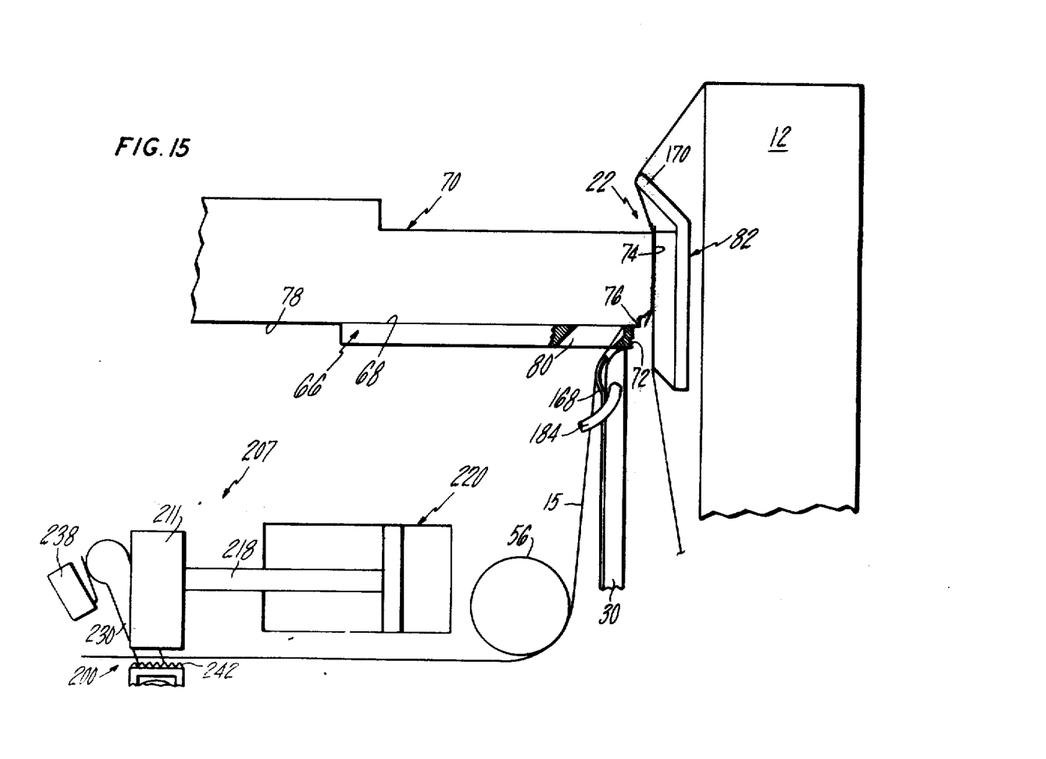
FIG. 15 is a view similar to FIG. 10 with the position of the parts shown during strap shearing.

At the sealing station 22, a combined clamp and shear plate on member 66 is secured to the frame 38 with an upper plant surface 68 (see FIG. 8, e.g.) shown in the specifically illustrated embodiment as being in underlying supporting relation to an elongated movable shear slide or shear 70 mounted on the frame 38 for longitudinal reciprocable movement toward and away from the strap trained through the sealing station 22. The free ends of members 66 and 70 respectively form abutment faces 72 and 74, and a lower edge portion of the free end of the movable shear 70 is undercut to provide a recessed cutting edge 76 along its juncture with its lower planar surface 78 which is in sliding contact engagement with the upper planar surface 68 of the clamp and shear member 66. The latter has a strap guide opening 80 adjacent its abutment face 72 which passes entirely through the body of member 66 in the direction of its thickness and in alignment with the strap guide assembly 24 and the entrance end 18 of strap chute 16, whereby strap extending from the strap supply through the strap guide opening 80 will be captured for shearing action when the cutting edge 76 of the movable shear 70 passes over the opening 80 upon movement of the slide shear 70 between its retracted starting position (FIGS. 2, 3 and 8) and an extended position (FIG. 15).

Figure 2:
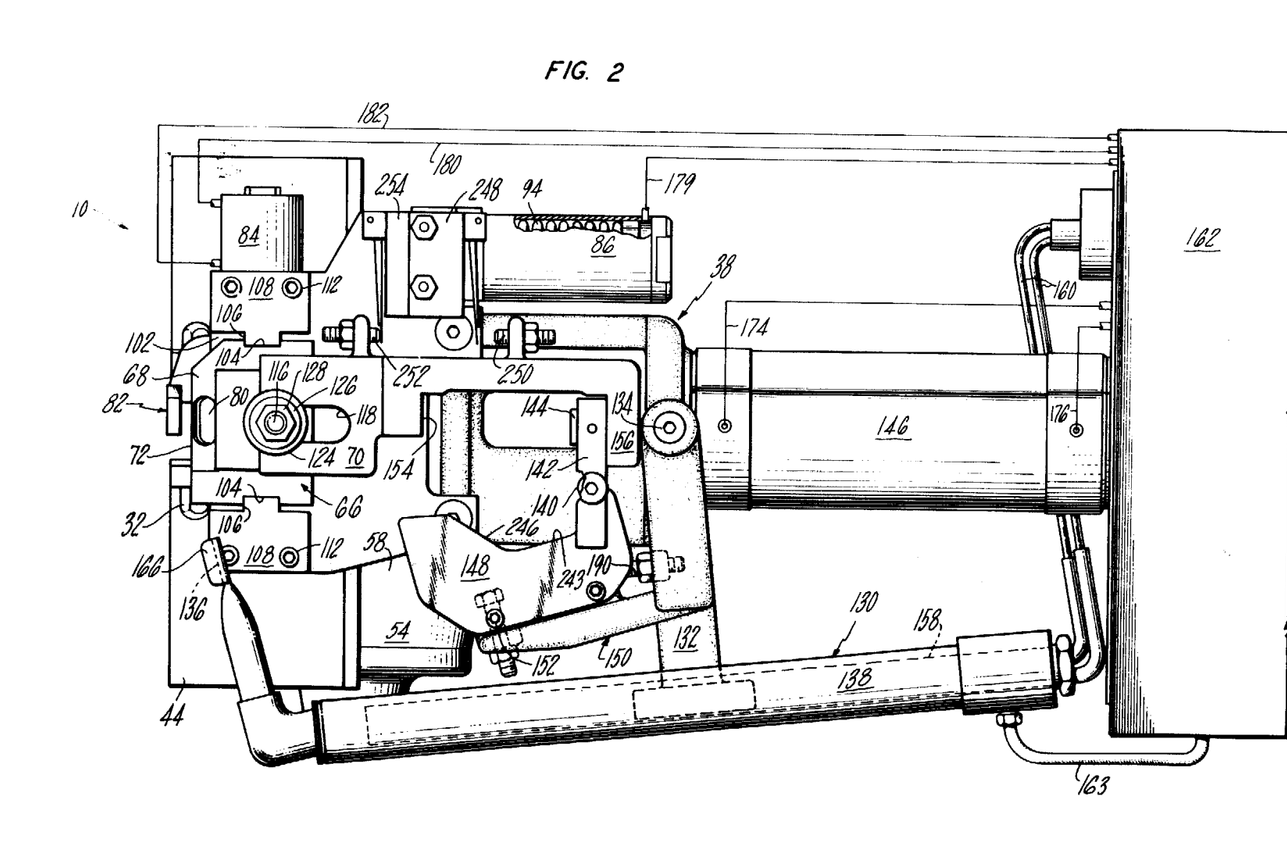
FIG. 2 is an enlarged top plan view, partly broken away, of the strapping mechanism of this invention.
Figure 5:
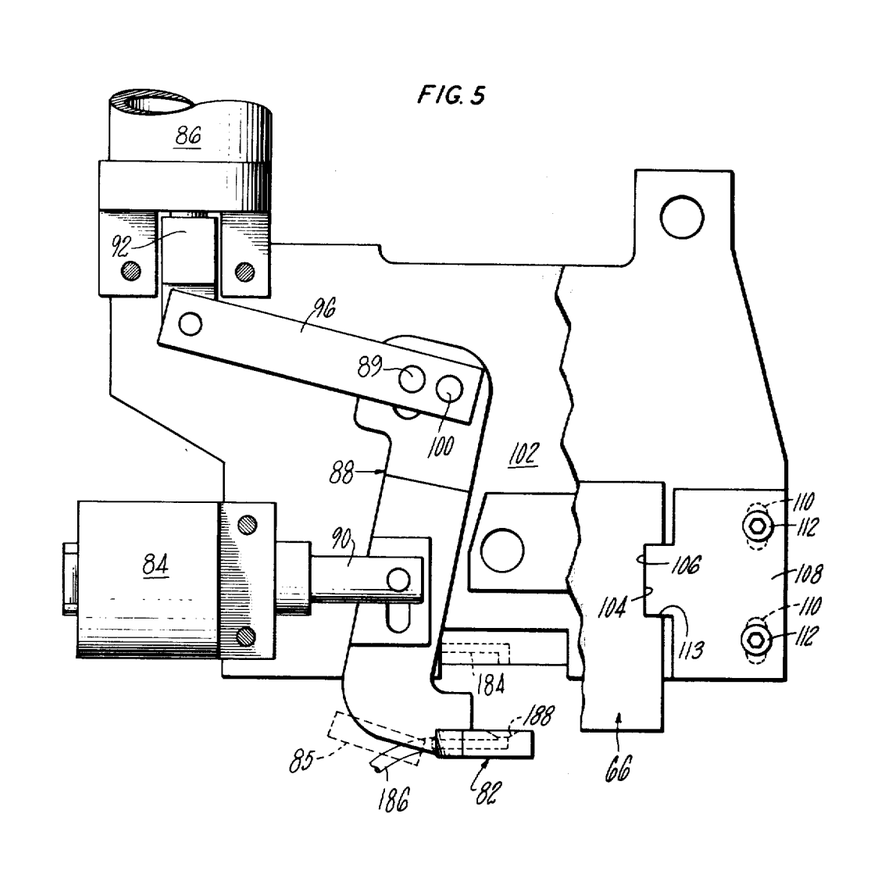
FIG. 5 is an enlarged top plan view, partly broken away and partly in section, showing a movable clamp and its linkage incorporated in the mechanism of FIG. 2.

To hold the leading end of strap during withdrawl and tensioning of strap, a free end strap clamp 82 is also provided by the mechanism 40 at the sealing station 22 as shown in FIGS. 2 and 5 wherein it will be seen that actuation of the clamp 82 is provided by a clamp positioning air cylinder 84 and a clamping air cylinder 86 mounted on the frame 38 at right angles to one another for sequential power operation of clamp linkage 88 about a fixed pivot pin 89 fixwd to the frame 38, the clamp 82 being integrally mounted on clamp linkage 88 in a one-piece unit. The clamp 82 is movable by a piston rod 90 of clamp positioning air cylinder 84 from an inoperative position (shown in broken lines in FIG. 5 at 85 wherein the rod 90 would be retracted) to its ready position (illustrated in full lines) with the rod 90 extended to position linkage 88 in its illustrated full line position. For clarity of illustration, the clamp and shear member 66 is not shown in FIG. 5, but with the clamp 82 in ready position, the clamp 82 is disposed in confronting spaced relation to the abutment face 72 of the fixed clamp and shear member 66 (FIG. 2). Upon operation of clamping air cylinder 86, its piston rod 92 will be extended against the bias of return spring 94 from its retracted position shown in FIG. 5 to swing link 96, pivotally connected to rod 92 and linkage 88, counterclockwise as viewed in FIG. 5 about fixed pivot pin 89 to drive clamp 82 via its connecting pin 100 and linkage 88 toward the abutment face 72 and into clamping position for securing the leading end of the strap against the fixed abutment face 72 with a substantial clamping force being applied to the strap. The abutment face 72 of the clamp and shear member 66 is preferably grooved or serrated to ensure a positive grip on the strap when the clamp is moved into clamping position.

To minimize need for close tolerances while yet providing for precisely matching the abutment face 72 of member 66 with the confronting face of clamp 82, the clamp and shear member 66 is supported on a fixed underlying backup plate 102 (FIGS. 2 and 5) secured to the frame 38. Opposite sides of member 66 have cutouts at 104 for receiving corresponding projections 106 extending laterally inwardly from a pair of adjustment blocks 108 supported on backup plate 102. The adjustment blocks 108 may be moved into desired position relative to the clamp and shear member 66 within certain limits established by oversize openings at 110 in the backup plate 102 (FIG. 5), for receiving shanks of releasable fasteners 112, and within the limits of predetermined clearances within cutouts 104. Upon adjusting the location of the fixed clamp and shear member 66 to precisely match its face 72 with that of movable clamp 82, forward walls 113, formed within cutouts 104 parallel to face 72, are engaged by adjustment block projections 106 and the fasteners 112 are secured to lock member 66 in precision alignment with the face of clamp 82.

With the member 66 secured in desired fixed location, the movable shear 70 may then be operatively mounted onto the upper planar surface 68 of the fixed clamp and shear member 66 with a predetermined spring loading maintaining shear 70 in continuous sliding engagment with member 66. This is achieved by an adjustable spring mounting device 114 (FIG. 3) having a threaded shear slide stud 116 fixed relative to the frame 38 to project upwardly through a slot 118 formed in shear 70 and having a bushing 120 fixed within the slot 118 to extend just above the upper flat surface of shear 70 where a locknut 122 threadably engaged on the stud 116 secures the head of the bushing 120 in position within the slot 118 to guide reciprocating movements of the slidable shear 70. Spring loading of the shear 70 against the fixed clamp and shear member 66 is effected under the bias of compression spring 124 coiled about stud 116 and captured between shear 70 and thrust washer 126 which is adjustably located along the length of stud 116 by an adjustable nut 128 threadably engaging the stud to selectively compress the spring 124 against the shear 70.

In accordance with still another feature of this invention, a heat gun assembly 130 is provided for heating the inner surfaces of the plastic strap at the sealing station 22 for forming a fused seal beween lapping strap portions. The heat gun assembly 130 is fixed to a pivot arm 132 mounted for swinging movement about a pivot pin 134 secured to the frame 38 such that an elongated blade or nozzle 136 on a forward end of heat tube 138 is supported for oscillating movement in a generally horizontal plane toward and away from the sealing station between a withdrawn or remote inoperative position (FIG. 2) and an operative position (FIG. 8) wherein the nozzle 136 is inserted into the open section of the combined strap clamping, sealer and shearing mechanism 40 above the exposed strap guide opening 80 with the movable shear 70 in retracted position. The position of the nozzle 136 is controlled by a cam roller 140 (FIG. 9) rotatably supported on a cam operator 142 fixed to an extendible and retractable piston rod 144 operated by a seal air cylinder 146 with its piston rod 144 in operative alignment with shear 70. The cam roller 140 is engaged for following movement by a cam plate 148 of a pivot yoke 150 (FIG. 2) and is secured by fasteners 152 to the pivot yoke 150 having an integral pivot arm 132. The cam plate 148 is urged into engagement with cam roller 140 by a spring 153 (FIG. 3) operatively connected between the frame 38 and the heat gun assembly 130. The above noted seal air cylinder 146 provides an additional function of operating the shear 70 upon movement of the piston rod 144 a sufficient distance to engage slide abutment 154 for moving the shear into its extended position and to return shear 70 to its retracted starting position (FIG. 2) upon cam operator 142 on rod 144 subsequently engaging a rear leg 156 of the shear 70, it being understood that the piston rod 144 extends through leg 156 of the shear 70 and is freely movable in relation to shear leg 156.

Figure 8:
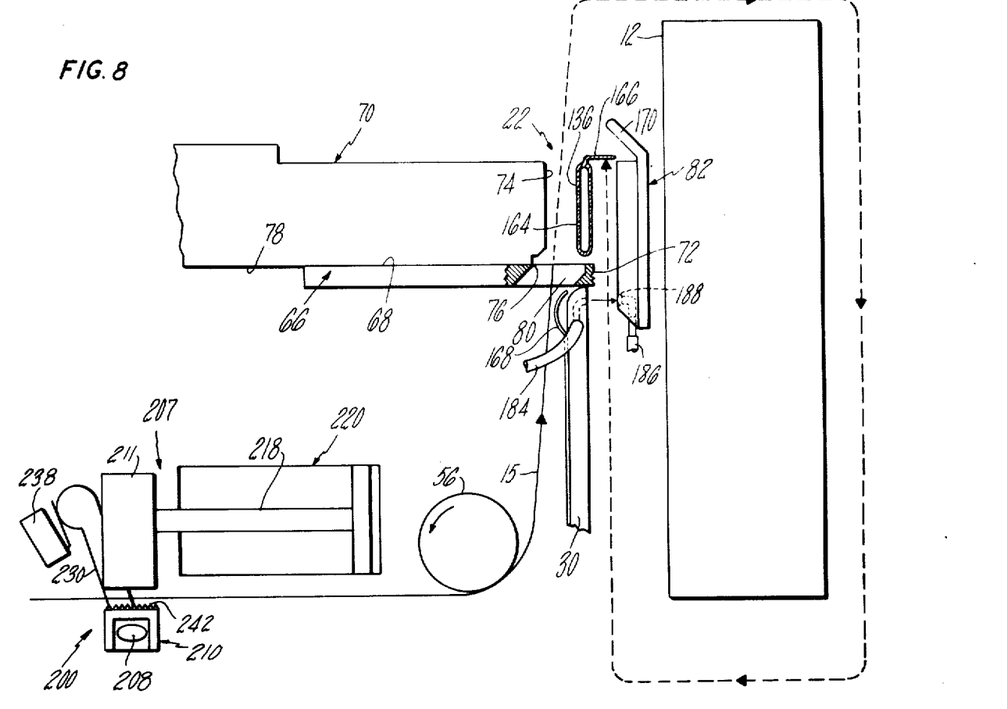
FIG. 8 is a schematic cross sectional side elevational view of the position of certain components of the strapping mechanism of FIG. 2 shown during strap feeding about an article to be bound.
Figure 9:
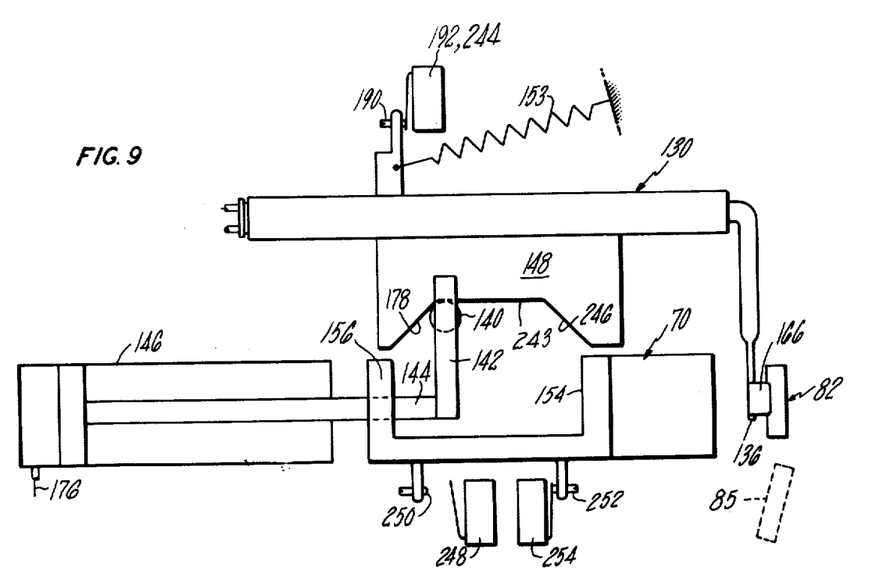
FIG. 9 is a schematic top plan view of the position of certain parts of the mechanism of FIG. 2 during strap feeding.
Figure 12:
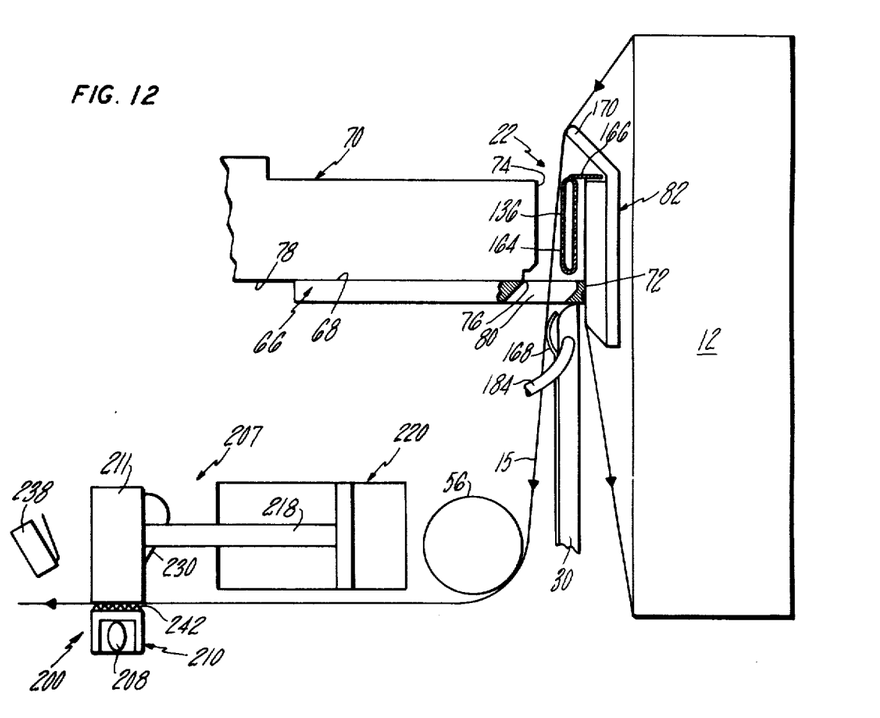
FIG. 12 is a view similar to FIG. 10 showing the position of the parts during strap heating.

In accordance with this invention, heat gun nozzle 136 effectively provides three distinct functions. Upon being moved into its operative position (FIG. 8) in the sealing station 22 during strap feeding, the nozzle 136 itself serves to direct strap 15 through the otherwise open gap between the strap guide assembly 24 and the entrance end 18 of the chute 16, thereby minimizing the frequently encountered and troublesome problem of strap buckling and jamming. In addition, the nozzle 136 has an offset projecting lip or stop plate 166 which acts as a fixed stop for a loose leading end of the fed strap afer it is fed about the article 12 and into position between a free end strap clamp and the nozzle (FIG. 8). The lip 166 projects toward the clamp 82 in slightly overlying relation to the uppermost aligned edges of the clamp and abutment face 74 of the shear 70 to ensure sufficient lapping of the leading strap end with strap trained through opening 80 for a good seal. Finally, tube 138 of the heat gun assembly 130 contains a heating element 158 connected by conductors contained within insulating conduit 160 to a suitable source of electrical power through a control box 162 containing the controls for the electrical and pneumatic systems of the machine. Conduit 163 provides a line for forcing air through the heat gun tube 138 and through holes 164 in opposite faces of the bladelike nozzle 136 when it is inserted into the sealing station 22 during a subsequent strap heating phase of the cycle (FIG. 12). With the nozzle 136 disposed between and in adjacently spaced, confronting relation to the surfaces of strap at the sealing station 22, and with forced heated air emanating from holes 164 in the nozzle 136, the nozzle thus serves to soften the opposed inner surfaces of the strap prior to the strap sealing phase of the cycle.

Another feature providing smooth, trouble-free high speed strap feedout is schematically shown in FIG. 8 for purposes of clarity wherein a strap end positioning leaf spring 168 is mounted within the guideway 60 at its exit end of the strap guide assembly 24 of the machine 10. This internal leaf spring 168 within the strap guide assembly 24 has an upper arcuate terminal portion which exerts a spring force on a leading free end of fed strap urging it toward the shear 70 at the outlet of the guideway 60 to virtually eliminate any possibility of strap being displaced out of position, due to its taking a set during storage in coiled condition, e.g., and being undesirably fed from the guideway 60 past the front face of the nozzle 136 between the nozzle and the clamp 82 rather than between the shear 70 and the nozzle 136. Also, as seen in FIG. 8, the free end strap clamp 82 is shown provided with an offset extension 170 directed angularly over the nozzle 136 in its operative position such that upon subsequent clamping and tensioning of the strap, the clamp extension 170 will separate the strap extending downstream through the strap guide opening 80 in the fixed clamp and shear member 66 in spaced apart relation to the clamped leading end of the strap to facilitate reinsertion of the nozzle 136 in the sealing station 22 following strap tensioning for subsequent heating of confronting strap surfaces by the nozzle 136 (FIG. 12).

Another problem frequently encountered concerns strap buckling at the sealing station such as at 22 and at other locations in the guideway means when the leading end of strap is arrested during strap feedout. To virtually eliminate such problems and related strap jamming problems within the guideway means, a built-in accumulator has been provided to receive any excess infeed of strap after the stop plate 166 terminates further movement of the strap end. For this purpose, a bottom opening 172 has been formed in the strap chute 16 at the corner of the chute in adjacent upstream relation to the re-entry rail and gate assembly 26 (FIG. 1). Since plastic strap is normally stored in and fed from a coiled condition wherein it takes what is commonly called a "coil set" causing an arcuate bend in a length of relaxed strap, such plastic strap is fed through the chute 16 such that changes in direction of strap feed correspond to the coil set of the strap, whereby the leading strap end will pass smoothly over the bottom opening 172 at the re-entry end 20 of the chute. Opening 172, accumulator provides a significantly simplified, trouble-free accmulator for receiving excess strap which simply buckles through the opening 172 to eliminate undesired upstream strap buckling upon arrest of its leading end.

The following summary of machine operation does not specifically describe certain details of various controls, fluid logic circuitry and piping arrangements located in the control box 162 and which have been found to perform satisfactorily, for a variety of different circuits and controls may be employed in accordance with conventional techniques to effect machine operation on manual, semi-automatic or automatic program sequencing. A clear understanding of this invention will be obtained from the following description of the sequence of operation of the mechanical components of the machine with reference to the drawings, bearing in mind that upon actuating an ON/OFF button 173 to ON, the electrical and pneumatic systems of the machine are energized to provide the desired control functioning. In addition, the various air cylinders for operating the machine components will be understood to be connected to a suitable source of compressed air through the lines schematically illustrated in FIGS. 2 and 3 connecting the cylinders to the control box 162.

The machine is started by actuating ON/OFF button 173 to its ON position. At the start of each strap feeding cycle, the heating element 158 is "on" but the air line 163 to the heat gun nozzle 136 is shut-off, and air is exhausted through lines 174 and 176 from both sides of seal air cylinder 146 with the piston rod 144 retracted as in FIG. 2. The line 179 to clamping air cylinder 86 is shut-off and clamp 82 is moved from inoperative position 85 (FIGS. 5 and 9) into ready position in spaced confronting relation to member 66 by line pressure applied through air line 180 and exhausting line 182 to operate clamp positioning cylinder 84 to extend piston rod 90 to effect clamp movement. With clamp 82 in ready position, a strap end sensor circuit is established for piloting a control valve, not shown, controlling the air motor 58. As seen in FIGS. 5 and 8, lines 184, 186 establish the sensor circuit for piloting the above mentioned control valve in the control box 162 and are respectively connected to an orifice in the face of rail 30 just below clamp and shear member 66 and an opening 188 in the face of clamp 82 which are registered in alignment with one another upon moving clamp 82 into ready position. With the seal cylinder 146 exhausted, spring 153 then extends the piston rod 144 a sufficient distance for the cam roller 140 to move across cam plate surface 178 (FIG. 9) to insert nozzle 136 into the sealing station 22 for strap support during feedout. With the nozzle 136 in deactivated condition to prevent strap damage but in operative position at the sealing station 22, the machine 10 is then conditioned for strap feeding and the air motor 58 is energized responsive to a valve actuator 190 carried by the heat gun assembly 130 depressing a valve 192 (FIGS. 3 and 9) connected to the control box 162 for opening an air feed line to motor 58 to drive the feed wheel 56 for strap feedout.

Figure 10:
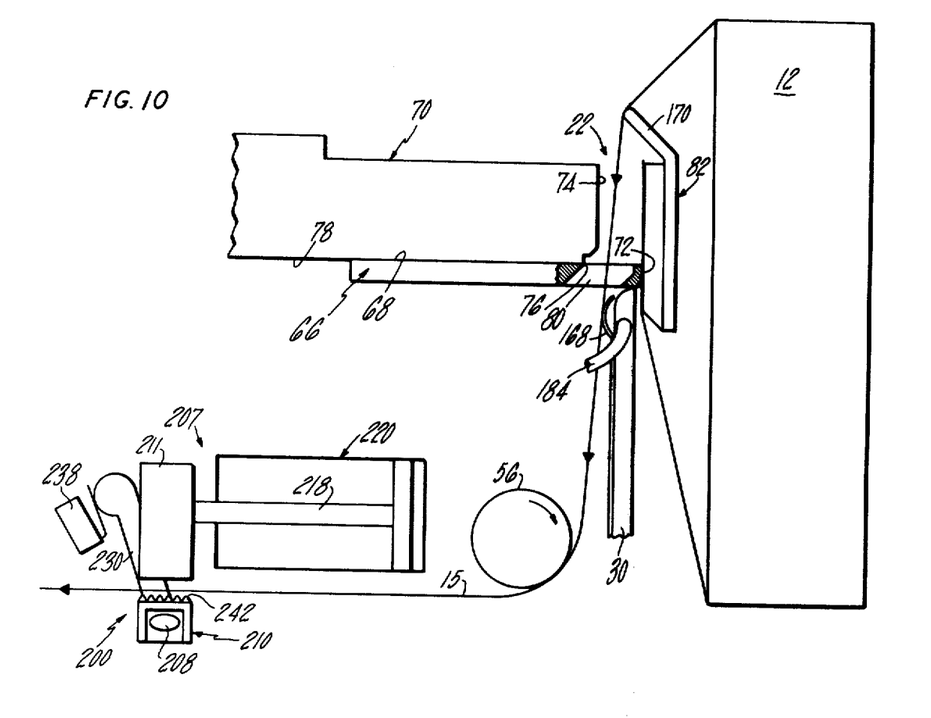
FIG. 10 is an enlarged schematic view of the position of the strap clamping, sealing and shearing mechanism and its associated puller unit following strap clamping and during strap takeup.

During feedout, a leading end of strap interrupts the strap end sensor circuit as it passes through the reentry rail and gate assembly 26 just upstream of the sealing station to de-energize the air motor 58 as the leading end of the strap passes into the sealing station and into abutment with the lip 166 of nozzle 136 serving as a positive stop. Interruption of the strap sensor circuit also causes line pressure to be applied to the rod side of seal air cylinder 146 through line 174 to retract piston rod 144, withdrawing gun nozzle 136 and also causes air to be supplied through lines 163 and 179 (FIG. 2) to activate the heating gun assembly 130 and to operate clamping cylinder 86 to extend its piston rod 92 (FIG. 5) to clamp the leading strap end between the shear and clamp member 66 and clamp 82 in its clamping position (FIG. 10). As described above, any tendency of the strap buckling and jamming is effectively minimized by the accumulator opening 172 in the chute 16 and the positive guiding assistance provided the strap during feedout by the nozzle 136 at the sealing station 22.

After the above described feeding of strap into a loop and when an article is in position to be bound, strap take-up is effected by momentarily depressing a takeup valve button 194 on the control box 162, causing actuation of a presettable takeup timer, not shown, in the control box 162 and to energize motor 58 to run in reverse while the leading end of the strap is held fast by the clamp 82 to pull back excess strap from the chute 16 through the machine 10. The takeup timer is preset to ensure that strap will be brought into contact with the article before the takeup timer times out. Excess strap is fed back into an auxiliary accumulator 196 (FIG. 3) between the strap guide assembly 24 and the strap supply, and upon withdrawal of the extra strap back into the machine 10 and bringing the strap loop into contact with the article 12, the motor 58 will stall preventing damage to strap from wheel slippage. Thee takeup timer times out providing a signal to the logic controls in control box 162, causing a gripper air cylinder 198 of a gripper device 200 (FIG. 3) to operate, reversing the normal air supply and exhaust to the cylinder 198 during feeding and takeup, whereby supply air is then fed through line 202 while line 204 is connected to exhaust to retract a piston rod 206 of gripper air cylinder 198 after feeding and takup to apply a substantial gripping or holding force on the strap to enable a puller mechanism 207 to apply a relatively high tension pull on the strap with a low speed drive to effect resultant high elongation of the strap.

Figures 6, 7:
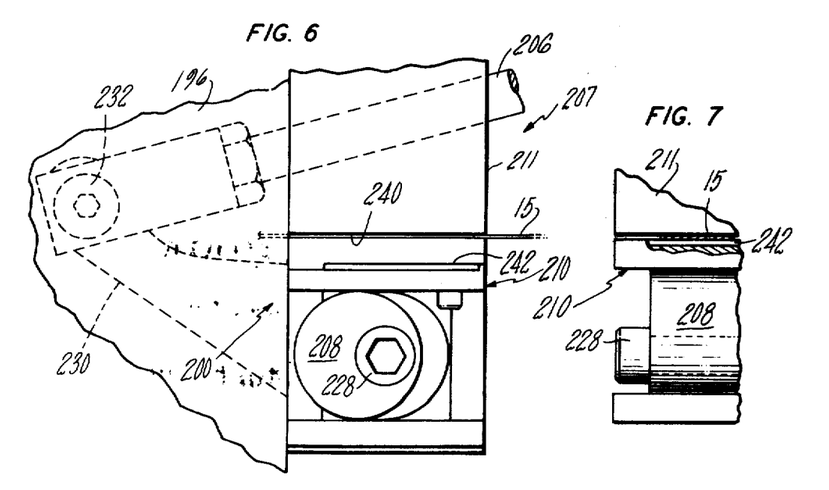
FIG. 6 is an enlarged side elevational view, partly broken away, illustrating a gripper device of a strap puller unit with certain parts of its linkage shown in phantom.
FIG. 7 is a sectional view, partly broken away, of the gripper device of FIG. 6.
Figure 11:
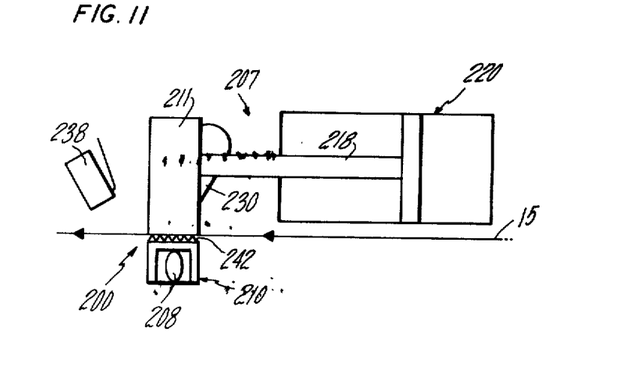
FIG. 11 shows a schematic view of the position of the puller unit during the strap tensioning and strap sealing.

The puller mechanism 207 that operates this high tension, relatively low speed drive, features a gripper air cylinder-operated rotating cam 208 (FIGS. 6 and 7) in a cage 210 fixed on a carriage 211 secured to a puller piston rod 218 (FIG. 3). Carriage 211 also provides a mounting for the auxiliary accumulator 196 which is guided for reciprocable movement parallel to the feed path of the strap from the strap supply on a track 212 fixed to the frame 38. The track 212 is slotted at 214 for receiving a headed stud 216 and sideload damping spring 217 movable along the slot 214 and suspending the carriage 211 and the accumulator 196 on the track 212, while also preventing undesired rotation of carriage 211 and parts attached thereto about puller piston 218. For moving the accumulator 196 and gripper device 200, the piston rod 218 is suitably fixed to the carriage 211 and is operated by a puller air cylinder 220 which is supplied with air pressure at its rod end through line 224 and exhausted through line 222 during strap feeding and takeup with the puller piston rod 218 retracted into normal position (FIGS. 3, 8 and 10), it being understood that the supply and exhaust to cylinder 220 are switched, responsive to timing out of the takeup timer, to extend piston rod 218 to move it from its normal position (FIGS. 3, 8 and 10) to extended position (FIG. 11).

To apply a substantial holding force uniformly distributed over an extensive length of strap to ensure a tight grip on the plastic material, a gripper plate 242 is supported on the cage 210 for following movement of the cam 208 eccentrically mounted on a cam shaft 228 which is rotatable by a connecting lever 230 drivingly connected to a pivot pin connection 232 on an end of piston rod 206 of the gripper air cylinder 198. The gripper air cylinder 198 is pivotally supported on a bracket 234 fixed to the carriage 211 and carries an actuator 236 normally engaging a lever of a valve 238 shown mounted on the carriage 211. Thus, open retraction of gripper air cylinder rod 206, valve actuator 236 releases valve 238 and moves gripper plate 242 into position to grip strap 15 against strap lock surface 240 of carriage 211. This action effected by operation of the gripper air cylinder 198 produces a substantial uniformly distributed clamping force over a length of strap resulting in the plastic strap being pulled with a very high force and high elongation but without damage or breakage of the strap secured between gripper plate 242 and the strap lock surface 240 of carriage all as the carriage 211 is moved by extension of puller rod 218.

The extent of movement of the cage 210 away from its starting position determines the tension applied to the strap and may be preselected at an operator station by pressure regulation of the air supplied to puller cylinder 220 and the length of time the puller cylinder is in operation. A pull timer, not shown, is provided in the control system to operate when the takeup timer times out, to control the time of operation of the cylinder 220 and to operate a seal timer, not shown, when the pull timer times out. Air feed through line 222 to cylinder 220 will cease upon timing out of the pull timer, and the air will be trapped on the side of the piston in cylinder 220 during operation of the seal timer.

Figure 13:
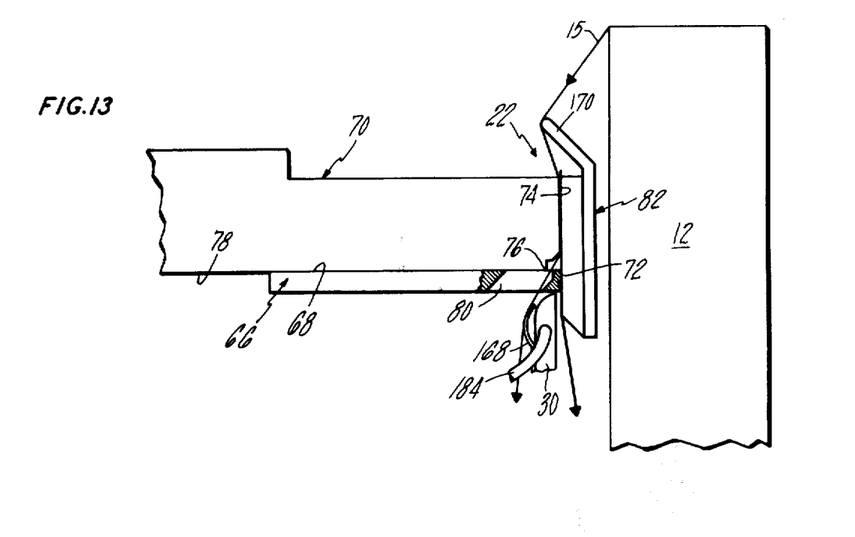
FIG. 13 is a schematic view shown on a relatively enlarged scale of certain parts of the strap clamping, seal and shearing mechanism during strap sealing.
Figure 14:
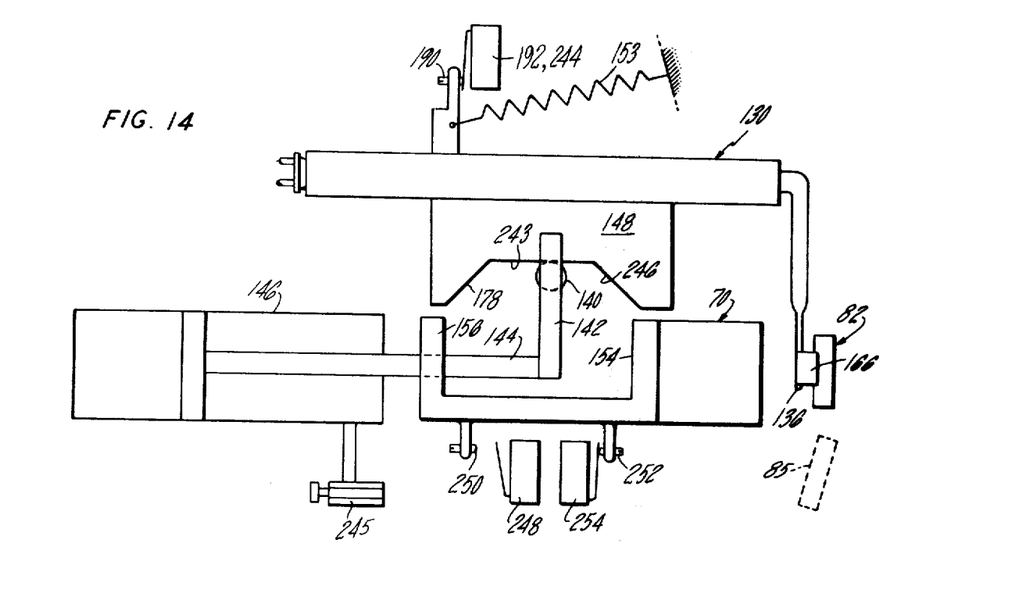
FIG. 14 is a view similar to FIG. 9 with the position of the parts shown during strap heating.

Upon timing out of the pull timer and start of the seal timer, the supply and exhaust to seal air cylinder 146 are switched by the control system to effect the following steps in the operation. Seal air cylinder rod 144 extends from retracted position to advance cam roller 140 along cam plate surface 178 onto cam surface 243, causing nozzle 136 to be reinserted into the sealing station 22, but in an activated heated condition for directing heated forced air through holes 164 against opposed inner strap surfaces adjacent opposite faces of the nozzle 136 (FIG. 12) while the strap supply end of the strap 15 is retained under tension by the puller mechanism 207. Upon moving gun nozzle 136 into operative position, a valve 244 (which was de-activated during the previous feeding phase) is engaged by actuator 190 (motor control switch 192 being de-activated by the control system during this phase of the cycle) to cause the air to exhaust from seal air cylinder 146 through line 174 to an adjustable flow control device in the control system (schematically shown at 245 in FIG. 14) to control the speed of advance of piston rod 144 and for regulating the length of time the nozzle 136 heats the strap surfaces. Upon cam roller 140 engaging cam surface 246, nozzle 136 is withdrawn, releasing valve 244 to de-activate the rod speed control device 245 and permitting the air on the rod side of the cylinder 146 to dump to atmosphere, thereby releasing rod 144 to move more rapidly into engagement with slide abutment 154 to advance shear 70 to press the melted strap surfaces together to fuse and form a seal (FIG. 13) upon cooling in a positively compressed condition. Any stretch in the strap during the heating step is accommodated by the trapped air in the piston side of puller air cylinder 220 which acts to automatically extend the piston rod 218 to maintain the strap in substantially taut condition. Advance of shear 70 is positively stopped by clamp 82 for proper cooling and forming of the seal joint, and it will be seen that the aforementioned undercut face 74 of shear 70 ensures that the cutting edge 76 of the shear 70 does not pass over guide opening 80, and the strap held in the opening 80 will be seen to be spaced apart from the upper front edge surface of the fixed clamp and shear member 66 surrounding opening 80 and also separated from the cutting edge 76.

Figure 16:
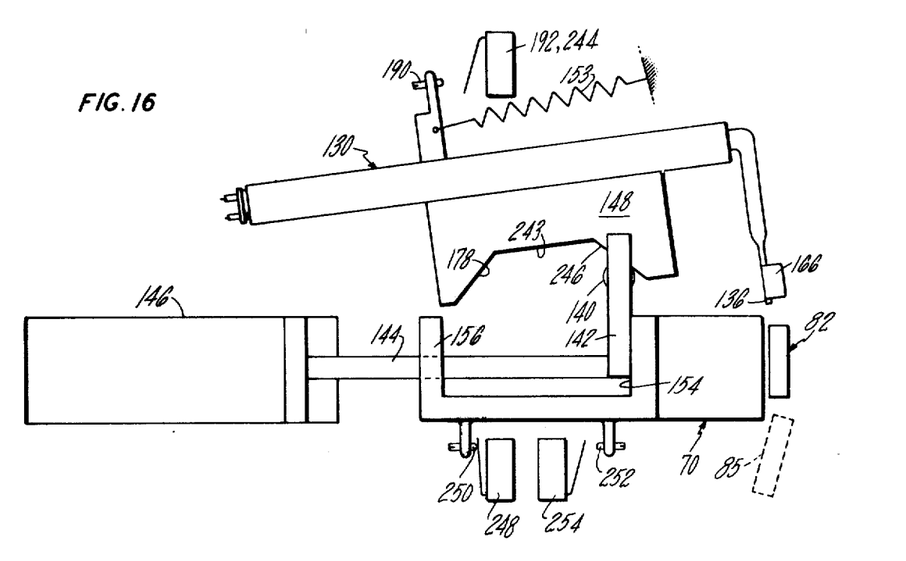
FIG. 16 is a view similar to FIG. 14 after strap shearing and just before completion of the strapping operation.

Upon timing out of the seal timer following the above described sealing step, the control system causes lines 202 and 222 to be connected to exhaust, de-activating the puller air cylinder 220, and air is supplied through line 204 to gripper air cylinder 198, extending rod 206 causing disengagement of the gripper plate 242 and relaxing the strap between the heat sealed joint and the gripper plate. This action promotes joint forming, prevents damage to the strap and undesired retraction of the strap 15 through guideway 60 toward the strap supply. To minimize any strap buckling problems retraction of rod 218 is delayed until after the start of the next strap feeding cycle. The extension of rod 206 reengages valve 238 to de-activate clamping air cylinder 86 and thereby releasing the shear 70 to advance to its fully extended position (FIG. 15) with its cutting edge 76 passing over strap guide opening 80 and shearing the strap in the sealing station. Valve 248 (FIGS. 2 and 16) is connected to the control system and upon being engaged by actuator 250 of shear 70 as it is fully extended (FIG. 16), the valve actuation causes retraction of the clamp positioning air cylinder 84 to withdraw the clamp 82 laterally into its inoperative position 85, releasing the sealed strap and the package, and causes retraction of the sealer air cylinder piston rod 144 into engagement with shear leg 156 and into fully retracted starting position which causes an actuator 252 of shear 70 to engage a second valve 254 to de-activate the seal air cylinder 146 and reset the control system circuitry for the next machine cycle.

The above described strapping machine is accordingly adapted to provide in sequence either autromtically or semiautomatically, for forwardly feeding strap from a strap supply into a loop about an article, for taking the strap to draw it into contact with the article, for tensioning the strap with high elongation, for heating confronting surfaces of strap under tensioned conditions, for pressing the heated surfaces into positive engagement with one another into a sealed joint, for relaxing the strap between the joint and the strap supply and then shearing the sealed strap from the strap supply and releasing the strap onto the article. Significant advantages are provided, notably the complete elimination of any need for additional clamping components for holding strap tensioned downstream of a sealing station, as conventionally required while shearing and/or a relaxed supply end of the strap. Moreover, new and improved components are provided, e.g., in the gripper and puller unit for tensioning strap, and in the combined clamping, sealer and shearing device of the machine which utilize a minimum number of multifunction parts which cooperate to provide a smoothly functioning high performance operation in a compact assembly capable of being mounted as a strapping head in different locations in various installations for highly reliable operation over an extended period of time with minimum service requirements.

As will be apparent to persons skilled in the art, various modifications, adaptations and variations of the foregoing specific disclosure can be made without departing from the teachings of the present invention.

We claim:

1. A strapping machine for binding an article with a length of generally flat strap to be joined together at its end at a sealing station to form a loop of strap and comprising strap guideway means for guiding strap into a loop about the article, a pair of strap shear members at the sealing station having opposed planar contact surfaces relatively slidable parallel to their plane of contact, the shear members including a fixed shear and a movable shear each having a free end defining an abutment face, the fixed shear having a strap guide opening formed adjacent its abutment face in alignment with the strap guideway means and forming a part thereof, a clamp member releasably engageable with a leading end portion of the strap looped about the article for clamping it against the abutment face of the fixed shear to condition the strap for sealing and shearing, the movable shear being reciprocable between a retracted starting position, wherein the strap guide opening of the fixed shear is exposed, and an extended position, the movable shear having a leading cutting edge at its free end along its juncture with its planar contact surface for shearing strap in the strap guide opening upon the movable shear being moved over the opening and into extended position.

2. The machine of claim 1 further including a heating member movable between an operative position at the sealing station between the leading end strap portion held by the clamp and a lapping trailing strap portion extending through the strap guide opening of the fixed shear, and a withdrawn inoperative position.

3. The machine of claim 2 wherein the clamp and the abutment face of the movable shear effect compression confronting softened surfaces of the lapping strap portions into a fused joint upon withdrawl of the heating member into inoperative position and movement of the movable shear toward its extended position, the clamp serving as a stop for the movable shear during compression of the strap portions before the cutting edge of the movable shear passes over the strap guide opening of the fixed shear.

4. The machine of claim 3 wherein the abutment face of the movable shear is in overlying relation to its cutting edge to effect strap sealing before shearing.

5. The machine of claim 2 wherein the heating member includes an elongated blade supported for swinging movement laterally of the path of movement of the movable shear, the heating blade being moved into its operative position in cold condition before strap feeding with the blade interposed between the movable shear and the clamp in downstream relation to the strap guide opening of the fixed shear and with the blade in generally parallel relation to a feed path of the strap for directing strap through an otherwise unsupported gap in the strap guideway means at the sealing station between the blade and the abutment face of the movable shear.

6. The machine of claim 5 wherein a stop plate is fixed on the heating blade to project therefrom such that, with the blade in its operative position, the stop plate is disposed between the blade and the clamp in the feed path of the strap for engaging the leading strap end prior to its being clamped into position against the fixed shear by the clamp.

7. The machine of claim 5 wherein the strap guideway means includes a strap guide assembly having an enclosed strap guideway with an exit end immediately upstream of the sealing station, and wherein a strap end positioning spring is disposed in the exit end of the guideway for engagement with and applying a spring force to the leading end of strap for directing it between the heating blade and abutment face of the movable shear during strap feeding.

8. The machine of claim 5 wherein an extension is formed on the clamp projecting generally in the direction of the movable shear in offset noninterfering relation thereto, the clamp extension being positioned in the feed path of the strap at the sealing station upon clamping of the leading end portion of the strap against the fixed shear for engaging and maintaining the strap extending through the strap guide opening of the fixed shear in separated relation to the clamped leading end portion of the strap to facilitate reinsertion of the heating blade between the strap portions for heating opposed lapping strap surfaces prior to their being fused and sheared.

9. The machine of claim 8 wherein the clamp extension maintains the lapping strap portions in sufficiently spaced apart relation to permit the blade to be interposed therebetween in good heat transfer relation but without contact engagement therewith.

10. The machine of claim 2 further including an extendible and retractable power operated piston rod longitudinally reciprocable between a retracted starting position and an extended position with the rod being aligned with the path of movement of the movable shear, the heating member being supported for pivotal movement between its operative and inoperative positions laterally of the path of movement of the piston rod and the movable shear, and a cam and cam follower connection between the piston rod and the heating member controlling its movements between said operative and inoperative positions responsive to movement of the piston rod to insert the heating member into the sealing station in cold condition during strap feeding for guiding strap through an otherwise unsupported gap at the sealing station through the strap guideway means with the movable shear in retracted position and thereafter withdrawing the heating member to be conditioned for strap heating.

11. The machine of claim 10 wherein the piston rod and the movable shear are spaced apart to provide a time delay during piston rod extension to engage the movable shear after strap feeding and subsequent movement of the heating member in strap heating condition between its operative and inoperative positions as controlled by the cam and cam follower connection in timed relation to the travel of the piston rod for effecting compression of confronting softened surfaces of the lapping strap portions into a fused joint between the movable shear and the clamp upon withdrawal of the heating member into inoperative positions and movement of the movable shear toward its extended position by the piston rod.

12. The machine of claim 11 wherein an adjustment means is provided for setting the speed of piston rod extension during heating of the strap surfaces, and wherein the adjustment means is deactivated, responsive to withdrawal of the heating member into inoperative position, to permit rapid movement of the piston rod into engagement with the movable shear to move it toward extended position for minimizing cooling of the heated strap surfaces before being joined together in compressed clamped relation between the movable shear and the clamp.

13. The machine of claim 1 further including a tensioning carriage mounted on a frame member adjacent a supply end of the strap guideway means upstream of the sealing station, the tensioning carriage being reciprocable along a strap supply feed path between a starting position adjacent the strap guideway means and a tensioning position in remote upstream relation to the strap guideway means, the tensioning carriage having a fixed plate and a movable plate, the latter being movable between a withdrawn position, providing a guideway between the plates through which strap is fed into the strap guideway means, and an extended clamping position for clamping a substantial length of strap against the fixed plate, power means for moving the movable plate between its withdrawn and extended clamping positions and second power means for reciprocating the tensioning carriage between its starting and tensioning positions.

14. The machine of claim 13 wherein the first and second power means are substantially simultaneously operable to clamp a substantial length of strap between the plates and to move the tensioning carriage into its tensioning position to effect strap tensioning about the article when the leading end portion of the strap is clamped against the abutment face of the fixed shear.

15. The machine of claim 13 further including a cage supported on the tensioning carriage for movement toward and away from its fixed plate, the movable plate being fixed on the cage in opposed facing relation to the fixed plate of the tensioning carriage, an actuating lever being drivingly connected to the first power means and supported on the tensioning carriage for angular movement about an axis in opposite angular directions, and a rotary cam being mounted within the cage in engagement with the movable plate, the rotary cam being drivingly connected to the actuating lever in offset eccentric relation to its axis of rotation for reciprocating the cage and its movable clamping plate responsive to operation of said first power means for selectively applying a uniformly distributed holding force over a substantial length of strap during operation of the second power means to move the tensioning carriage into its tensioning position.

16. The machine of claim 15 wherein the first power means include a power cylinder pivotally mounted on the tensioning carriage and having a piston rod operated by the power cylinder and pivotally connected to the actuating lever for clamping and releasing the plates as the piston rod is extended or retracted by the power cylinder.

17. The machine of claim 1 wherein the fixed shear has a laterally projecting wall on opposite sides thereof in parallel relation to its abutment face, wherein a frame member is provided with the fixed shear being releasably mounted thereon, wherein a pair of adjustment blocks are mounted on the frame laterally of the fixed shear for engagement with its laterally projecting walls, and wherein releasable fastener means are provided for adjustably positioning and securing the adjustment blocks in engagement with the laterally projecting walls of the fixed shear upon positioning its abutment face in parallel relation to the clamp face.

18. The machine of claim 1 wherein a frame is provided for supporting the fixed shear, wherein the movable shear has a slot formed therein parallel to its path of movement, wherein a movable shear guide stud is mounted on the frame in the slot for guiding movement of the movable shear, wherein a spring is mounted on the shear guide stud urging the planar contact surface of the movable shear into engagement with the corresponding surface of the fixed shear, and adjustment means on the stud engaging the spring for varying the spring force on the movable shear.

19. The machine of claim 1 further including a frame, and wherein the strap guideway means include a re-entry rail and gate assembly mounted on the frame and providing a strap guide channel downstream of the sealing station and immediately upstream of the fixed shear for guiding a leading end portion of strap into the sealing station between the clamp and the abutment face of the fixed shear, and selectively adjustable mounting means connecting the re-entry rail and gate assembly to the frame for securing the re-entry rail and gate assembly in selected adjusted position relative to the faces of the fixed shear and clamp, the re-entry rail and gate assembly being adjustable both laterally and longitudinally of the path of strap feed by its adjustable mounting means.

20. The machine of claim 1 wherein the strap guideway means includes a generally rectangular strap chute having an entrance end in downstream alignment with the strap guide opening of the fixed shear and a re-entry end in upstream adjacent relation to a corner of the chute which is in adjacent upstream relation to the sealing station, and wherein an accumulator opening is formed in the re-entry end of the chute and through which excess strap is free to buckle upon arrest of the leading end portion of the strap while yet permitting the plastic strap to be fed smoothly through the chute prior to such arrest.

21. A strapping machine for binding an article with a loop of strap formed of heat sealable material and comprising a frame, a combined strap clamp and shear member fixed on the frame and having a free end serving as a clamp abutment face, the clamp and shear member having a strap guide opening adjacent its free end and through which strap is fed from a strap supply into a loop about the article to be bound, a movable clamp supported on the frame for releasably clamping a leading end portion of strap looped about the article against the clamp abutment face of the fixed clamp and shear member, a combined strap seal and shear member mounted for sliding movement on the fixed clamp and shear member, the seal and shear member being movable between a starting position wherein the strap guide opening is exposed and an extended position wherein the movable strap seal and shear member is in lapping relation to the strap guide opening, a heating member supported on the frame for movement laterally of the path of movement of the movable seal and shear member between a first position in remote relation to the lapping strap portions and a second position wherein the heating member is disposed between confronting inner surfaces of the lapping strap portions for heating and softening their confronting inner surfaces, and means for moving the seal and shear member into a sealing position intermediate its starting and extended positions upon withdrawal of the heating member into its first position, the movable clamp serving as a positive stop for the movable seal and shear member establishing its intermediate sealing position for clamping and sealing the heated inner surfaces of the lapping strap portions into a fused joint, and the seal and shear member being movable into its extended position upon release of the movable clamp to effect strap shearing.

22. The machine of claim 21 further including a strap tensioning unit having a gripper device located on a strap supply side of the lapping strap portions for engaging a substantial length of strap with a uniformly distributed high clamping force, and a puller unit for moving the gripper device in a direction opposite the direction of strap feed for tensioning the clamped strap about the article to be bound, the gripper device and the puller unit being rendered inoperative upon movement of the strap seal and shear member into its intermediate sealing position whereby strap on a supply side of the sealed length of strap is relaxed for shearing upon movement of the seal and shear member into extended position.

* * * * *

UNITED STATES PATENT OFFICE
CERTIFICATE OF CORRECTION

PATENT NO. : 3,906,851
DATED : September 23, 1975
INVENTOR(S) : Robert P. Clark, Robert Lee Haven, and Franz A. Kneidl It is certified that error appears in the above–identified patent and that said Letters Patent are hereby corrected as shown below:

Column 3, line 34, the word "selecated" should be --selected--.

Column 4, line 3, after the word "strap" insert --15--. Line 4, the word "znd" should be --and--. Line 31, the word "plant" should be --planar--. Line 63, the word "fixwd" should be --fixed--.

Column 7, line 54, cancel "accumulator" and insert -- however --.
Line 55, the word "accmulator" should be --accumulator--.

Column 10, line 12, the word "all" should be --211--.

Column 11, line 36, the word "automti-" should be --automati- --. Line 39, before "the strap" insert --up--.

Column 9, line 19, the word "Thee" should be --The--.

Signed and Sealed this twenty-seventh Day of January 1976

[SEAL]

Attest:

RUTH C. MASON
Attesting Officer

C. MARSHALL DANN
Commissioner of Patents and Trademarks